United States Patent [19]

Vayssiere, deceased et al.

[11] E Patent Number: Re. 32,192

[45] Reissued Date of Patent: Jun. 24, 1986

[54] REFRACTORY PIECE PERMEABLE TO GASES

[75] Inventors: Pierre Vayssiere, deceased, late of Metz, France, by Monique Vayssiere, executrix; Charles Roederer, Metz, France; Jean-Claude Grosjean, Semecourt, France; Roland Gravé , Metz, France; F. Schleimer; F. Goedert, both of Dudelange, Luxembourg; R. Henrion, Esch/Alzette, Luxembourg; L. Lorang, Differdange, Luxembourg; J. Colling, Luxembourg, Luxembourg

[73] Assignee: Institut de Recherches de la Siderurgie Francaise, France

[21] Appl. No.: 619,536

[22] Filed: Jun. 11, 1984

Related U.S. Patent Documents

Reissue of:

[64] Patent No.: 4,340,208
Issued: Jul. 20, 1982
Appl. No.: 143,306
Filed: Apr. 24, 1980

[30] Foreign Application Priority Data

Apr. 25, 1979 [FR] France ..... 79 10445
Apr. 30, 1979 [LU] Luxembourg ..... 81208
Feb. 8, 1980 [FR] France ..... 80 02905

[51] Int. Cl.[4] ..... C21C 5/48

[52] U.S. Cl. ..... 266/220; 75/59.1; 75/59.12

[58] Field of Search ..... 266/220; 75/59, 60

[56] References Cited

U.S. PATENT DOCUMENTS 3,330,645 7/1967 De Moustier ..... 75/59

*Primary Examiner*—Peter D. Rosenberg
*Attorney, Agent, or Firm*—Fishman & Dionne

[57] ABSTRACT

The refractory piece permeable to gases according to the invention is designed to be incorporated in the inner refractory lining of a metallurgical container so that one of its surfaces will be in contact with the molten metal bath in said container, the opposite surface being equipped with means for introducing a gas under pressure.

This piece, whose shape is generally hexahedral, consists essentially of a mass of nonporous refractory material that has a number of local discontinuities 8 extending throughout the piece along its height h between the surface in contact with the molten metal and the opposite surface. In an advantageous method of embodiment, the local discontinuities 8 are obtained by an assembly 1, in a metal casing, of nonporous refractory elements 2, in the form of plates and which are placed side by side along their large lateral surfaces, without any material gaskets or seals between them.

The piece according to the invention is easy to make. In addition, it has all of the required qualities of selectivity or orientation so that its life will be about as long as the life of the surrounding refractory lining of the metallurgical container in which it is designed to go, while allowing the desired amounts of gas to be blown into the metal bath.

109 Claims, 7 Drawing Figures

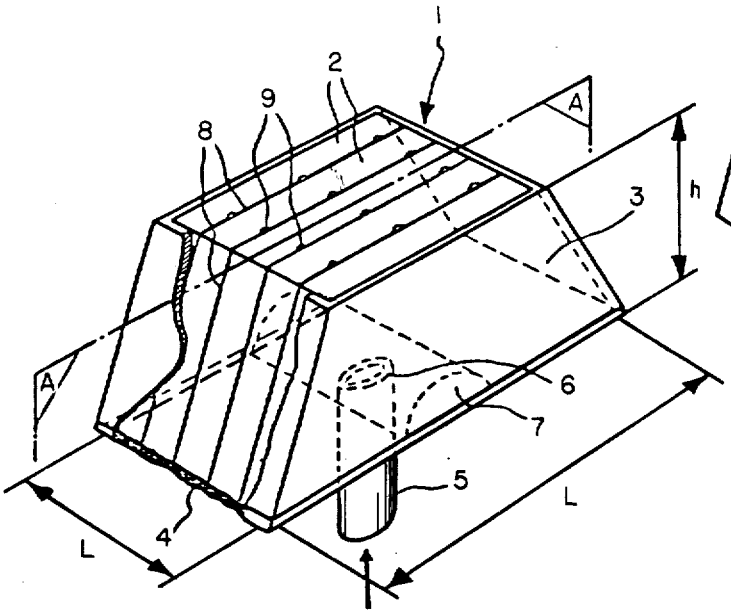
FIG. 1
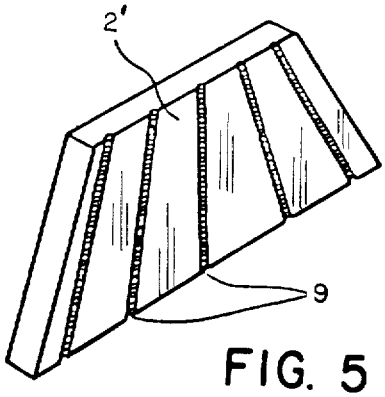
FIG. 5
FIG. 4
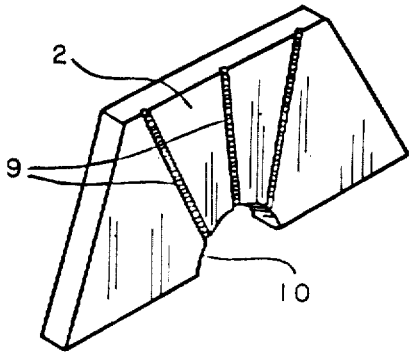
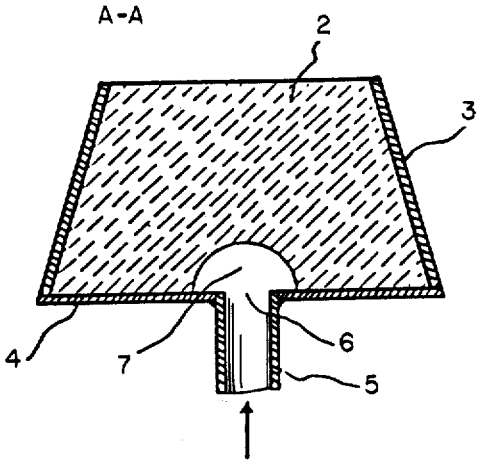
FIG. 2
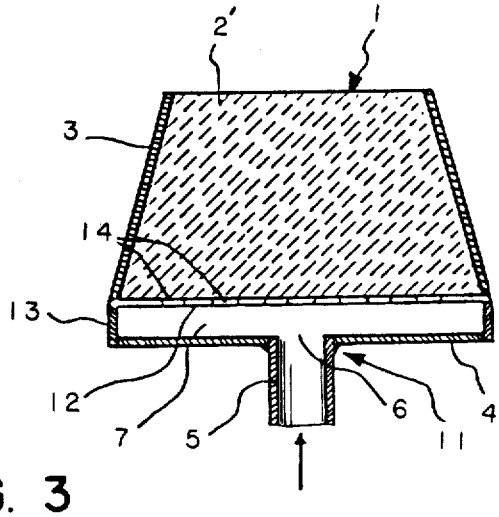
FIG. 3

REFRACTORY PIECE PERMEABLE TO GASES

Matter enclosed in heavy brackets [ ] appears in the original patent but forms no part of this reissue specification; matter printed in italics indicates the additions made by reissue.

TECHNICAL BACKGROUND OF THE INVENTION

The present invention relates to pieces made of refractory material, permeable to gases.

It is known that certain industrial practices require a gas to go through a refractory piece.

Such is the case, for example, in the field of metal technology, particularly steel, where, for metallurgical purposes, it has already been proposed that gases be blown into a bath of molten metal in a metallurgical container through permeable refractory pieces, generally hexahedral in shape, similar to that of the bricks usually used for the refractory lining of the inside of the container. These pieces are incorporated in the refractory lining at a level below that of the surface of the bath, and more generally on the bottom, so that one of its surfaces is in contact with the molten metal and the opposite surface is available for introducing a gas under pressure.

In this type of application, where the molten metal is in contact with the blast surface of the permeable piece, it is of course desirable that the permeability of the latter be "selective", that is to say, that it permit the gas to go through in one direction without, as a result, causing infiltrations of liquid metal in the opposite direction, if possible even in the absence of a blast of gas. For this purpose, the manufacture of permeable refractory pieces is known with the use of a raw material of a special particle size, molded and sintered, so that the mass obtained has a statistically isotropic open microporosity (French Pat. Nos. 1.094.809 and 1.162.737).

Furthermore, it is equally desirable that this permeability be also "oriented", because the flow of blown gas has to be directed in such a way that it enters under pressure in the porous piece through one side and goes out through the opposite aide in contact with the molten metal, while the other surfaces must remain completely tight to prevent too much side loss of the gas which naturally tends to grow with the height of the piece. For this purpose, it has been already proposed that this piece be suitably enclosed in a tight receptacle, consisting for example of a metal casing (French Pat. No. 1.031.504), or a layer of refractory concrete rendered tight by selecting a particle size finer than that of the central area (French Pat. Nos. 1.183.569 and 1.350.751).

Elements of this type with a composite structure are relatively easy to make. However, their use poses certain problems, particularly in relation to the phenomenon of differential expansion under heat between the porous core and the tight surrounding periphery, leading to the undesirable formation between the two of preferential passages for the gas which is blown in, with all of the resulting consequences both from the standpoint of controlling the blast and the life of the porous elements.

To get around these difficulties, it has been suggested that monolithic elements with an oriented permeability be manufactured, by passing through an intermediate step where a naturally nonporous refractory piece is formed but which temporarily has on the inside a close network of links oriented in the direction of the blast, and which is later destroyed, leaving in its place an oriented network of fine multiple channels (French Pat. No. 1.271.201). These pieces appear to be satisfactory so far as their use is concerned, but it is in their manufacture that difficulties appear, because they require a complex and delicate equipment whose characteristics suitable for industrial production apparently have not yet been defined precisely.

Finally, this permeability must be sufficiently great so that the gas flows are not limited too much in view of the pressures that can be provided by the usual pneumatic installations in this field which, to give an idea of the figures involved, are usually around some 10 bars of relative pressure, approximately. As we can readily imagine, the greater the permeability of the porous piece, the less it is "selective" and the more it is subject to rapid wear by erosion in contact with the liquid metal. Therefore, one is faced with contradictory requirements, for which the solutions proposed up to this time have been compromises that are not always satisfactory, so far as is known to the inventors.

As an indication, it seems to have been in the field of ladle metallurgical treatment (addition, bringing up to grade, etc.) that the porous refractory pieces mentioned previously were first applied. In this case, since the required flow rates for the rabbling gas are relatively low (of the order of 5 liters per piece, approximately), the permeable pieces used generally have fairly good characteristics of selectivity and strength, so that their rate of wear is just about the same as that of the surrounding refractory lining.

On the other hand, in the case of very large capacity containers such as melting furnaces or converters, since the flow rates of the gas blown in are higher (about 10 times more), the pieces employed have to be highly permeable. This is correlated with the fact that their "selectivity" is impaired, making it impossible, as a general rule, to have a discontinuous blowing operation. Furthermore, mechanical wear is accelerated and becomes much more rapid than that of the refractory lining, which is even more unacceptable when we consider that the bottoms are designed to last for a much greater number of heats than the ladles, and it is presently out of the question to consider replacing a worn out piece during a campaign.

SUMMARY OF THE INVENTION

A purpose of our invention is to offer a refractory piece whose permeability to gas presents simultaneously all of the required qualities of selectivity and orientation so that its life will be just about the same as that of the refractory lining of the container in which it will be placed, while making it possible to blow in gas at the desired rate of flow.

Another purpose of our invention is to be able to make a piece of the above type that will retain the combined advantages of an oriented permeability inherent in pieces having a homogeneous structure with a network of fine internal channels, and the simplicity of manufacture which is specific to porous pieces that have a composite structure, and without their respective disadvantages.

To this end, the object of our invention, in a metallurgical container having an inner refractory lining and containing a bath of molten metal, is a refractory piece permeable to gases, which is generally hexahedral in shape, incorporated in the refractory lining of the container at a level below the surface of the bath so that one of its surfaces is in contact with the molten metal and the opposite side is equipped to receive means for introducing a gas under pressure, said piece consisting essentially of a mass made of nonporous refractory material with several local discontinuities extending throughout the piece along its height, between the surface in contact with the molten metal and the opposite surface.

According to a characteristic of our invention, these local discontinuities are obtained by making the nonporous refractory mass of an assembly of unit elements placed side by side without any material seals between them and between which means of separation can be interposed.

According to another characteristic, these local discontinuities are obtained by making the nonporous refractory mass of a monolithic block with perforations or slots oriented in the direction of the blown gas and in which are inserted, without any apparent play, elements that are not destructible by heat and preferably have a smooth wall, such as steel elements.

A further object of our invention is a process for the manufacture of the permeable refractory piece consisting of unit elements as explained above, and this process includes the following successive operations:

cut longitudinally, along its height, an ordinary brick of nonporous material usually available commercially and which is generally intended for use as part of the inner refractory lining of a metallurgical container;

then, put the original brick back together, placing the refractory elements obtained side by side, without any material seals between them;

assemble all of the above by compressing tightly in a lateral metal casing;

and seal off one of the two extremities of the casing by means of a closing plate equipped with means for introducing a gas under pressure.

Preferably, in order to insure good gas-tightness at right angles to the casing, a peripheral layer of nonporous refractory concrete is poured between the casing and the assembly of refractory elements.

Therefore, as one can understand, the basic idea of our invention consists in creating an artificial permeability in a piece made of refractory material which is not naturally permeable, while providing in the latter discontinuities oriented in the direction in which the gas is blown and which are made through a special design of the piece, namely through an assembly of elements that form narrow junctional zones between them through which the gas passes.

This assembly can be made in two distinct ways: either by incorporating in a refractory block dispersed metallic or refractory longitudinal elements that go right through the block in the direction of the blow gas, or by placing side by side independent refractory elements that are also oriented in the direction of blown gas.

In the first of these cases, the zones for the passage of the gas are localized around the periphery of the elements incorporated in the refractory block, while in the second of these cases they are more diffuse because they are distributed in joint planes, that is to say, along more or less rectilinear narrow slots that go to the ends of the piece and therefore divide the latter into a number of unit elements.

This new design for permeable refractory brick finally makes it possible to achieve the desired twofold objective, namely a life of the piece which is as long as that of the refractory lining of the metallurgical container in which it is set and a high capacity of the gas flow, adapted to the volume of the bath that this container holds. This latter feature seems to be due in particular to the fact that since the assembly of the elements that make up the piece is made without having to be concerned about the tightness of the junctional zones, the latter can allow the passage of a greater flow of gas than is possible through the refractory mass, as porous as it may be. This being the case, one does not need to resort to the extremely porous masses known previously which allow the passage of fairly high gas flows but also wear out very rapidly.

In keeping with the usual practice, the refractory assembly is placed advantageously in a metal receptacle consisting of a lateral casing open at one end so as to leave open the upper surface of the refractory mass which is intended to come in contact with the molten metal, and, of course, having local discontinuities on its surface for passage of the gas, while the other end of the metal casing is sealed off by a closing plate equipped with means for the delivery of the blowing gas.

We recall that a particular function of the metal receptacle is to provide lateral tightness at the periphery of the refractory mass. In addition, since its outer surface is more even and more free than that of the refractory lining, the metal casing permits the piece to be applied closely against the walls of the opening in the refractory lining in which it is placed, or facilitates the removal of this piece in order to replace it, if necessary. We can also point out that this casing acts as a reinforcement frame that protects the refractory mass inside against any shocks during transportation or handling.

In conformity with our invention, the piece constructed by the assembly of unit elements placed side by side can be made according to several variants. The first category of variants takes into account the shape of the refractory elements that lie alongside of each other.

From this standpoint, the latter may have a flat shape (plate, band, etc.) whose width is equal to (and therefore defines) the width of the refractory piece. In this case, the elements are placed side by side along their large lateral surfaces and follow each other in parallel fashion over the length of the piece. This makes a "sandwich" type of assembly that defines several joint planes whose traces on the surface are in one direction (a network of parallel lines in the direction of the width).

The refractory elements may also have a more compact and elongated shape (a parallelepiped with a square or slightly rectangular base) whose sides are shorter than those of the piece. In that case, the elements lie side by side with their four lateral surfaces parallel to each other, and this time follow one after the other along the length and also along the width of the piece. This produces a "bundle" type of assembly defining a number of intersecting joint planes uniformly oriented as previously in the direction in which the gas is blown, but whose traces on the surface are in a two-direction pattern (network of intersecting lines).

A second category of variants is based on the way in which the elements that lie side by side are assembled.

One possibility is to put them in contact with each other through their lateral surfaces. Another possibility is to place refractory elements side by side, interposing means of separation between them so as to maintain them a short distance from each other and thus be in a position to increase the rates at which the gas is blown if necessary. These means can take many forms. They include for example gauged spacing blocks leaving open joints between the refractory elements, such as wires or others, oriented in the direction of the blown gas or inserts made of refractory concrete lodged in longitudinal notches made for this purpose opposite one another on the lateral surfaces of the side-by-side refractory elements. These means of separation can also be made of separate partitions inserted without any apparent play between the refractory elements, for example small plates of porous and therefore permeable refractory material, or simple flat or corrugated metal strips.

It is understable that the presence of strips makes it possible to increase the flow of gas, because the flow of gas in the joint planes is facilitated along smooth metal walls, and also there are twice as many joint planes between two refractory elements lying side by side.

Furthermore, if the strip is corrugated, the junctional surface is increased still further, and so are the gas blowing possibilities.

Similar results can be obtained when the refractory elements are placed side by side in contact with each other.

In this case, the permeability of the piece can be increased by making superficial grooves on the latter surfaces of the elements which, once the latter are assembled, will form fine rectilinear channels for the passage of the gas that is blown in.

Such may be the case when one wishes to deliver large gas flows that may reach several tens of liters per second, for example 40 liters/second, and is now beginning to be done with cast iron converters of the type where oxygen is blown in through the top, after the period of refining proper, in order for example to superdecarburize the metal bath. However, the permeability obtained by simply joining the elements together is amply sufficient for iron and steel ladled rabbling operations where the flow rates employed are much lower, namely around 5 liters/second approximately, or ten times less than in the case of the above-mentioned converter.

BRIEF DESCRIPTION OF THE FIGURES

The invention will be understood well and other aspects and advantages will be brought out more clearly through the following description, given as an example, and by referring to the attached pages of drawings where:

FIG. 1 shows a perspective view, partially cut away, of a permeable refractory piece in conformity with the invention, consisting of a "sandwich" type assembly of refractory elements placed side by side in contact with each other through their large lateral surfaces;

FIG. 2 is a vertical sectional view along plane A—A of FIG. 1;

FIG. 3 is a sectional view similar to that of FIG. 2, representing a design variant;

FIG. 4 shows in perspective a refractory plate that makes up the complete piece illustrated in FIGS. 1 and 2;

FIG. 5 is the homologue of FIG. 4 with regard to the porous piece illustrated in FIG. 3;

On the FIGS., the same elements are designated by identical references or completed by the marks "'" in the case of homologous elements.

DESCRIPTION OF PREFERRED FORMS OF EMBODIMENT

Figure 6:
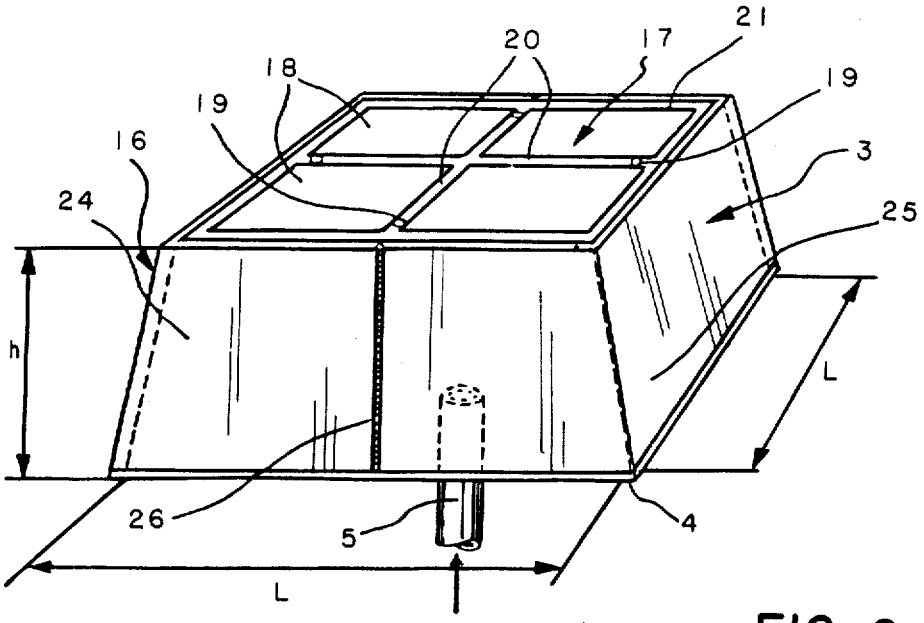
FIG. 6 is a perspective view of the top of a permeable refractory piece in conformity with the invention, consisting of a "bundle" type assembly of refractory elements placed side by side with spacing blocks between them.

FIG. 1 shows the entire permeable refractory piece as it may appear to the user before being incorporated in the masonry of the metallurgical container for which it is intended, for example a converter in which oxygen is blown from the top. This piece whose shape is generally hexahedral, similar to that of the refractory bricks that constitute the inner lining of the container, consists essentially of an assembly 1 of refractory plates 2 that have the same height h and the same width l as the piece. Plates 2 are juxtaposed and pressed so as to be in mutual contact at their main faces, following each other along length L of the piece. In the example described, the tightening and cohesion of the assembly are ensured by binding by means of a metal casing 3 made, in the usual manner, of a steel sheet about 1 mm thick. A closing plate 4 completes casing 3 so as to form a tight receptacle in which assembly 1 is fitted. The gas blowing under pressure arrives, in the direction indicated by the arrow, through a pipe 5 tightly fitted on closing plate 4 around an opening 6, which feeds into a gas distributing channel 7 made inside assembly 1.

The plates 2 constituting the latter are made of refractory material of standard composition and manufacture, e.g., magnesium oxide without prior grading and therefore nonporous. However, their juxtaposition without a physical seal, according to the invention, defines in the piece local discontinuities that are parallel to each other, denoted by reference 8 on FIG. 1 and appearing on the surface in a network of rectilinear slots along the width of the piece. These discontinuities 8 constitute passage zones enabling the gas under pressure, arriving in distributing channel 7, to cross refractory unit 1 and come out through the end in contact with the molten metal. It is to be understood that the presence of these permeable areas, well positioned on the joint planes, affords the refractory unit 1 thus constituted an anisotropic permeability, i.e., oriented in the direction of blowing of the gas.

This permeability is, of course, also selective, for although the permeable character of junctional zones 8 is pronounced enough to ensure passage of the gas blowing under pressure, it is nonetheless sufficiently diminished to prevent infiltrations of molten metal. In that connection, it can be indicated that, in the case of molten steel, the limiting permeability threshold corresponds to a micropassage section in the order of 1 $mm^2$ maximum.

As already stated, it may be desired to increase the permeability of assembly 1 artificially. This result can be achieved, according to a variant of the invention, by forming fine grooves 9 on the surface of plates 2, best visible on FIG. 4. These grooves can be made by machining (saw strokes) or obtained at the time of molding of plate 2 by means of a mold adjusted accordingly. The same is true, furthermore, of recess 10, leading, once the plates are assembled, to the formation of gas distributing channel 7. Grooves 9 can be made on only one of the main faces, as shown on FIGS. 1 and 4, or on both main faces. In that case, a shift of their position can be provided for so as to place them in a staggered arrangement in each joint plane 8. They can also, if desired, be paired so as to define small channels, once assembly is made. It is to be pointed out, however, that, whatever the variant envisaged, it is desirable to provide grooves, the total passage section of which is less than approximately 1 $mm^2$, in order to avoid any risk of penetration of molten metal. As can be seen on FIG. 4, these grooves are arranged radially so as to join distributing channel 7, in the assembled piece, to the upper end intended to be brought in contact with the molten metal.

The variant illustrated on FIG. 3 consists of replacing the gas distributing channel inside the refractory assembly with a space 7' having the same function, but placed outside and below refractory unit 1. The immediate advantage of that type of arrangement resides in the fact that the gas distributing space this time affects the whole section of refractory unit 1, which was not the case with the previous variant.

The piece of FIG. 3 is made from the one illustrated on FIGS. 1 and 2, replacing closing plate 4 with a base plate 12 perforated with holes 14 which can be distributed at random, but preferably located at right angles to the joint planes designated by 8 on FIG. 1. The part thus obtained, composed of assembly 1 sheathed by casing 3 and by base plate 13, is placed in a lower frame 11 containing a closing plate 4' and an end coupling 13 on which the upper part is placed and then welded for reasons of tightness. In that way, a distributing space 7' is formed between base plate 12 and closing space 4', receiving the blowing gas through an opening 6' made in the closing plate and extended through a delivery pipe 5', and distributing it into permeable assembly 1 through holes 14.

An example of grooves refractory plates adapted to this type of set-up is illustrated on FIG. 5. As may easily be realized, this plate, denoted by reference 2', differs from its homologue of FIG. 4 only in two essential points: the recess constituting the internal gas distributing channel has disappeared and the rectilinear surface grooves 9' this time directly join the lower base by means of which the gas arrives to the opposite end intended to be brought in contact with the molten metal.

It is not indispensable for casing 3 to extend over the entire height of the refractory plates. However, the casing does not have as sole function the mechanical maintenance of assembly 1 but serves also to channel in the right direction the gases which would tend to escape laterally.

It is also to be stressed that the trapezoidal shape of the piece illustrated on the FIGS. does not at all constitute a necessary characteristic of the invention, but a relatively customary arrangement having the sole of ensuring, under the pressure of the blowing gas, the locking of assembly 1 in the masonry of the furnace and thus avoiding for it any risk of being propelled into the metal bath. Other means ensuring such locking can, of course, be suitable.

Now, as far as the number of refractory plates 2 (or 2') constituting assembly 1 is concerned, that number is left to the free choice of the user. As for the thickness of refractory plates 2, it advantageously comes to around 3 to 5 cm. Under these conditions, if a size is chosen for the permeable piece equivalent to that of a standard refractory brick ($15 \times 10$ $cm^2$), in order to be able to make a simple substitution, the number of plates juxtaposed along the length of the piece is then five, as in the case of FIG. 1.

The operations to be performed in order to manufacture the permeable refractory piece just described are now going to be briefly indicated. The receptacle in which assembly 1 is going to be mounted is available at the outset. That receptacle is, however, incomplete, that is, it lacks on casing 3 one of its side walls. Through that temporary opening, refractory plates 2 are strung out by placing their main face perpendicular to the direction of introduction. The receptacle serves as a guide and refractory plates 2 placed edgewise to closing plate 4 are juxtaposed with each other by coming in contact at their respective main faces. The initial depth of the receptacle is so determined that it is almost totally occupied when the desired number of plates is attained. The face missing on casing 3 is then joined by welding and, in order to ensure the cohesion of the assembly, a fine layer of refractory concrete is poured between that joined face and the last plate inserted. The piece thus made is then ready for use.

This method of manufacture is, of course, not at all limitative and a preferred method of manufacture, which is perfectly applicable to making the piece just described, will be explained below, with reference to FIGS. 6 and 7.

Furthermore, this piece is not limited to the examples illustrated by the FIGS.

That is so, notably, with the variants having grooves whose number of plates, distribution on the lateral surfaces of the elements and shape or section are not imposed by the invention. Thus, the choice of a rectilinear section or rounded shape, as shown on the FIGS., was guided only by considerations of simplicity in making this type of groove, through molding of the plates, or of the lesser resistance they offer to the passage of gas, which, in this respect makes them more suitable than others for the blowing of a gas loaded, for instance, with solid particles in suspension.

Similarly, the nonporous refractory elements used for construction of the piece according to the invention are not necessarily plates, but can take other forms or shapes, insofar as it remains possible to assemble them by juxtaposing them with each other by lateral faces, that is, so as to give the joint planes a common direction, which is that of crossing of the gas.

Elongated elements can thus be used, shaped, for example, into parallelepipeds with square or slightly rectangular base, whose assembly in the receptacle gives the unit a permeability no longer limited to a series of parallel joint planes, but extended to a whole network of planes forming a more or less dense grid, depending on the size of the elements.

Such a variant, which will moreover be described in greater detail below, makes it possible, just like the grooved variants previously described, to increase the rate of passage of the gas. It is to be pointed out, furthermore, that the presence of surface grooves can possibly alone give the piece sufficient permeability. Consequently, the construction elements can be tarred bricks, while grooveless elements absolutely cannot contain a tarred binder, in order to prevent their sticking at high temperature which, as is understandable, would lessen the permeability of the refractory piece.

It is to be recalled that means other than grooves can be employed to increase the permeability of the piece. As already stated, the essential function of these means is to keep refractory elements 2 a short distance away from each other. They can, for example, consist of small plates of this time porous refractory material or of thin sheets, flat or corrugated and inserted with no apparent play between refractory elements 2. When the permeable piece is intended for a steel mill converter, the separating sheets as well as the outer casing are advantageously covered with a protective coating against the risks of recarburization by contact with molten metal.

These separating partitions can be set in place at the same time as refractory elements 2 according to an alternate mounting method. But it is also possible to use the partition work as a honeycombed mold into which the nonporous refractory material is poured, which makes it possible to avoid, if desired, forming the discontinuities searched for in the refractory mass, without having to assemble preformed refractory elements.

Figure 7:
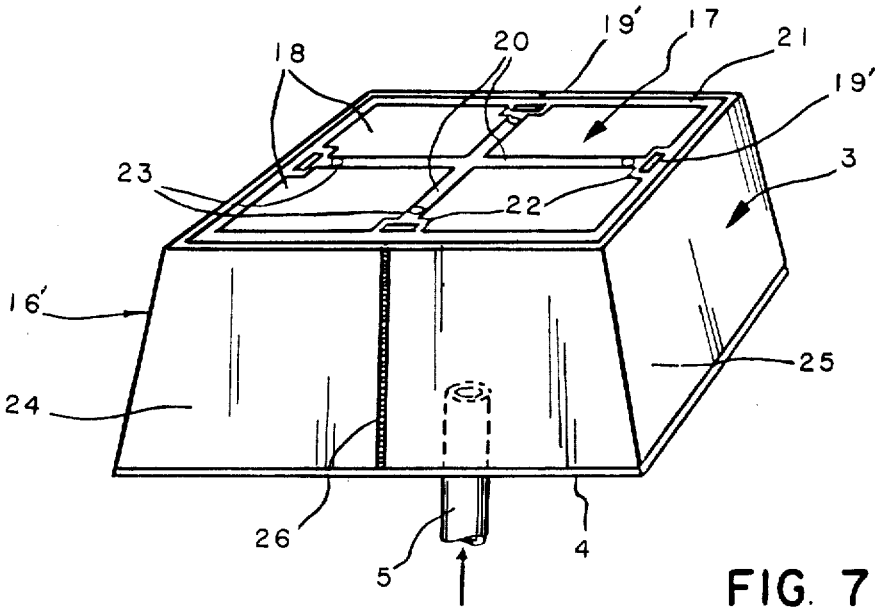
FIG. 7 is a perspective view of a design variant of the piece shown in FIG. 1.

Another category of variants of the invention is now going to be described, with reference to FIGS. 6 and 7, consisting of separating the refractory elements by means of spacing blocks creating open joints between them.

To illustrate the variant indicated above, based on the geometric shape of the refractory elements, a piece 16, 16' has been represented here, formed by assembly of parallelepipedal elements 18 of the same height h as the piece and juxtaposed at their side faces, one after the other along length L and along width l of the piece. It is clear, however, that the presence of spacing blocks between the elements is unrelated to a particular shape of the latter amd can very well be envisaged in the case of refractory elements shaped into plates extending over the whole width of the piece, as represented on FIG. 1.

Referring to FIGS. 6 and 7, it can then be seen that permeable refractory piece 16 (16') consists essentially of an assembly 17 of nonporous refractory elements 18, numbering four in the two examples considered and joined together without touching by insertion of spacing blocks 19 (19'). The cohesion of the assembly is ensured, as previously, by compressive binding by means of lateral metal casing 3. Closing plate 4 completes the casing in the usual manner, in order to form a tight receptacle in which the assembly appears only at its free upper face designed to be brought in contact with the molten metal held in the metal container. The gas blowing under pressure arrives, in the direction indicated by the arrow, through the delivery pipe 5 tightly fitted on closing plate 4 and connected to a feed source not represented.

The elements 18 comprising the assembly are advantageously made of refractory material of standard composition and manufacture, e.g., magnesium oxide calcined at high temperature in order to withstand well chemical and mechanical wear by contact with slag, but without prior grading, and, therefore, naturally nonporous. However, their nontouching assembly by means of spacing blocks 19, 19' defines between them narrow spaces 20, constituting zones of forces passage for the gas under pressure arriving at the base of the piece through pipe 5 and crossing refractory assembly 17 in order to come out at the free upper end in contact with the molten metal. It is to be understood that the presence of these blowing spaces 20 located at the joint planes of the assembly imparts to the latter a permeability "guided" in the gas blowing direction.

This result is achieved, of course, if the conditions relative to spacing blocks 19 (19') and to tightness at right angles to lateral casing 3 are observed.

As far as the latter point is concerned, the invention provides for insertion between the inner face of the casing and the wall of refractory elements 18 of a layer 21 of a jointing product of standard type in the field considered and the placement of which will be described in greater detail below.

As far as spacing blocks 19 (19') are concerned, it is important for them to be designed to form narrow blowing spaces 20, that is, the thickness of which is preferably between 0.1 and 0.5 mm. In fact, the permeability of piece 16 (16') depends only on the thickness of spaces 20. It can then, at least in principle, be increased or reduced at will by simply changing the gage of the spacing blocks. However, permeability varying in the opposite direction from "selectivity,", the risk of infiltration of molten metal increases with the thickness of the blocks. In that connection, it is then preferable for the thickness of the blocks to be as slight as possible. The lower limit depends, however, on the unit flow of gas to be passed through the refractory piece, taking into account the pneumatic pressure that is available above the piece. On the other hand, if the thickness of the blocks is increased too much, the pneumatic pressure, which must be maintained to avoid infiltrations of molten metal, then generates a considerable flow of gas, often simply wasted, especially considering that this flow must then be permanently maintained, even outside of the metal making phases requiring gas blowing.

Taking these indications into account, the thickness of the spacing blocks is preferably close to 0.3 mm and, in any case, ranges between around 0.1 mm and 0.5 mm.

These characteristics are especially valid for application of the refractory piece according to the invention to a metallurgical container, such as a pig metal refining converter. They can, of course, be modified for other applications, but the order of magnitude remains approximately the same if the specific flows of gas exceed approximately ten liters per second.

These conditions being observed, the spacing blocks can take many different embodiments to the extent that they do not block the section of passage of spaces 10 sufficiently to prevent the flow of rabbling gas that it is desired to pass there.

In that connection, the spacing blocks can consist, for example, of deliberately pronounced surface irregularities of elements 18, such as wedges or pellet-shaped protuberances, obtained by molding on the actual manufacture of these elements.

Another embodiment consists of connecting the spacing blocks between the elements at the time of the assembly operation.

In that case, the blocks advantageously come in the form of elongated bodies, longitudinally oriented in spaces 20, that is, in the direction of crossing of the rabbling gas, in order not to interfere with their passage. FIGS. 6 and 7 respectively illustrate two different embodiments of spacing blocks of this type.

In the example of FIG. 6, spacing blocks 19 are simple commercial wires, preferably steel, calibrated to the desired dimension. There are four of them, that is, one per refractory element, all longitudinally oriented so as to reduce their beam as much a possible in the flow of gas. They can take any position; however, it is preferable to locate them at the ends of the joint planes in order to minimize, as is understandable, the functional plays of the elements on being joined.

In the example of FIG. 7, spacing blocks 19' consist of refractory concrete inserts lodged in notches 22 provided at the ends of the joint planes and obtained on the assembly of elements 18, which present for that purpose a clearance along their edge.

The inserts can be poured in place after joining elements 18 without touching thanks to the crosspieces 23 set in the immediate vicinity of the notches and having the twofold role of creating blowing spaces 20 and constituting a sealing element enabling the inserts to be poured without risk of inflation of liquid concrete into spaces 20.

Crosspieces 23 are advantageously of the same shape and gauge as wires 19 (FIG. 6). However, in contrast to the latter, their spacing block function being only temporary, since they serve as relays for inserts 19', they can be made of strands of heat-destructible material, e.g, polyamides such as that marketed under the "nylon" trademark, which can be either eliminated in the last phase of manufacture of the piece or allowed to be destroyed at high temperature on use in the converter. It is to be pointed out that the variants, described with reference to the figures, are characterized, notably, by the fact that spacing blocks 19 or 19' are bodies joined in the piece as a whole and not, as previously indicated, integral parts of refractory elements 18. The use is thus avoided of preformed refractory elements, specially designed for manufacture of the piece according to the invention, which is obviously not without influence on the cost of the latter. Rather, the placement of joined spacing blocks makes it possible to use refractory elements that are entirely commonplace and even "standard" on the market.

In that connection, a substantial advantage of the invention resides in the fact that piece 16 (16') can be easily produced by taking as raw material a simple commercial refractory brick that is transformed according to the process to be explained. A commercial brick of nonporous refractory material, such as magnesium oxide, is cut longitudinally with a saw. The elements obtained are then joined without touching by setting calibrated spacing blocks 19 (FIG. 9) between them or, as the case may be, temporary crosspieces 23 (FIG. 7). In the latter instance, the edges of the elements situated in the vicinity of the crosspiece are submitted in advance to a removal of material, e.g., by milling, so as to be able to form the notches 22 into which a concrete insert 19' is poured by any appropriate means.

In all cases, the cohesion of the assembly is then ensured by binding by means of lateral metal casing 3 with insertion of a layer of jointing product, which ensures gastightness at right angles to the casing. The unit is completed by closing plate 4, joined by welding on the lower edge of the casing.

The performances that can be expected from the piece made that way as a blowing unit depend, notably, on the quality of the gastightness at the casing-refractory element interface. That tightness is directly linked to the nature of jointing product 21 and/or to the way in which it is set in place. In that connection, the jointing product is advantageously an expanding refractory concrete that is poured in liquid state in the interval initially provided between the metal casing and the refractory elements. Expansion, in the course of subsequent drying, then produces, by reaction of the casing and of the elements, a compression of the jointing product, ensuring the tightness sought.

However, that variant demands knowledge and, therefore, a mastery, which is always difficult, of the mechanical strains that are developed in the piece and that can, in particular, lead to deformation of the casing by expansion, rendering incorporation of the piece in the masonry of the metallurgical container designed to receive i more difficult and even risky.

A preferred variant, corresponding to the best embodiment we know how to make at the present time, consists of proceeding as follows: metal casing 3 consists of two identical U-shaped half-shells 24 and 25. One begins by inserting assembly 13 in any one of the half-shells, e.g., half-shell 24, after having coated its inner surface with a jointing product which adheres naturally to the metal wall. An identical coating is then applied to the inner face of half-shell 24, which is placed around the half of the assembly going beyond half-shell 24. The half-shells are so dimensioned that, at this stage of the operation, their respective edges are opposite two by two.

The unit is then compressed by pushing on the base of each half-shell with the aid of any appropriate means, e.g., a vice, and the operation is finished by joining the two half-shells at their edges by means of beads 26 in the middle of the face of the metal casing 3 thus reconstituted. Another advantageous variant of the invention consists of sawing the original refractory brick along a cross-cut, so as to obtain, as shown on the figures, intersected blowing spaces 20. A saw blade is chosen for doing so, the thickness of which takes into account the thickness of side casing 3, so as to form a permeable place which retains the same gauge as that of the original brick, making it possible, in particular, to incorporate the permeable piece in the general architecture of the refractory lining without difficulty.

According to another characteristic of the invention—not indispensable but useful when the original refractory brick is impregnated with tar, e.g., a tar-impregnated magnesium oxide brick—elements 18 undergo tempered heating after cutting and before assembly, in order to eliminate the volatile elements inevitably present and which would, consequently, risk flowing and then of filling up the blowing spaces. The tempered heating operation can last a few hours and thus make it possible to go from a total carbon content of approximately 8% to 2% by weight.

It goes without saying that our invention should not be limited to the examples described, but can present numerous other variants. That is so, notably, with the spacing blocks 19 between the elements and which can be highly varied in nature, e.g., piano wire, etc., to the extent that their gauge and their orientation adhere to the indications previously supplied. Furthermore, their number is not necessarily limited to the proportion of one per refractory element.

Likewise, the number of refractory elements 18 constituting the assembly is not necessarily equal to four, but can be less or greater than that number. Furthermore, the notches made opposite each other on the refractory elements and defining a housing for the concrete inserts are not necessarily placed at the ends of the joint planes, but can be provided anywhere, even inside the blowing spaces.

In addition, it is to be pointed out that in conformity with another category of variants not represented on the figures, but the simple mention of which is sufficient to enable one versed in the art to make them, the piece according to the invention can consist of nonporous refractory mass, formed no longer from juxtaposed unit elements, but from a single block containing holes or slots inside, which cross it in the gas blowing direction, and in which elements that are not heat-destructible and preferably smooth-walled, e.g., steel elements, are inserted without apparent play.

We are claiming:

1. For use in a metallurgical container having an inner refractory lining and containing a bath of molten metal, a composite refractory member permeable to gas adapted to be incorporated in the refractory lining of the container below the surface of the bath so that one of the faces of the composite member is in contact with the molten metal, said composite refractory member consisting essentially of an assembly of non-porous refractory elements juxtaposed without seals between the same in order to provide a plurality of discontinuities extending throughout the height of the composite member between the face in contact with the molten metal and an opposite face; and means for feeding a gas under pressure against said opposite face.

2. A composite member as defined in claim 1, wherein said composite member has a generally hexahedral shape.

3. A composite member as defined in claim 1, wherein said non-porous refractory elements are plate-shaped and are juxtaposed at their main lateral faces.

4. A composite member as defined in claim 1, wherein said non-porous refractory elements are of elongated shape and are juxtaposed parallel to each other with said discontinuities extending transverse to each other.

5. A composite member as defined in claim 3, wherein said juxtaposed non-porous refractory elements are in contact with each other along their main lateral faces.

6. A composite member as defined in claim 1, and including separating means inserted between said juxtaposed non-porous refractory elements to keep the same a short distance from each other.

7. A composite member as defined in claim 6, wherein said separating means consists of calibrated spacing blocks.

8. A composite member as defined in claim 7, wherein said spacing blocks are wires extending spaced from each other and being oriented in the direction of the height of the composite member.

9. A composite refractory member as defined in claim 7, wherein said spacing blocks are inserts of refractory concrete, and wherein said non-porous refractory elements are respectively provided with opposite longitudinal notches in which said inserts are respectively lodged.

10. A composite refractory member as defined in claim 6, wherein said separating means consist of joint partitions inserted without play between the juxtaposed nonporous refractory elements.

11. A composite refractory member as defined in claim 10, wherein said partitions are porous refractory plates.

12. A composite refractory member as defined in claim 10, wherein said partitions are thin metal sheets.

13. A composite refractory member as defined in claim 3, wherein said plate-shaped non-porous refractory elements are provided at least at one of the faces thereof facing an adjacent plate-shaped element with a plurality of transversely spaced grooves extending between the face of said composite refractory member in contact with the metal and its opposite face.

14. A composite refractory member as defined in claim 1, wherein said non-porous elements are blocks shaped and arranged with respect to each other to form together a composite member of generally hexahedral shape, each of said blocks having at least two faces directed against faces of adjacent blocks and including metal spacer elements between said faces of said blocks.

15. A composite refractory member as defined in claim 2, and including a metallic casing having a peripheral wall tightly enclosing said composite refractory member and a bottom wall, said casing having an open end at the face of the composite member in contact with the molten material, said means for feeding gas under pressure against the opposite face of said composite member being provided at said bottom wall.

16. A composite refractory member as defined in claim 15, and including a gas distribution chamber between said bottom wall and said composite member, said gas distribution chamber communicating with said discontinuities.

17. A composite refractory member as defined in claim 15, wherein said peripheral wall consists of two U-shaped shells joined at facing edges thereof.

18. A composite refractory member as defined in claim 15, and including a peripheral layer of non-porous refractory concrete sandwiched between said composite member and said lateral wall of said casing.

19. A method of producing a composite refractory member consisting essentially of an assembly of non-porous refractory elements juxtaposed without any seals between the same in order to provide a plurality of discontinuities extending through the height of the composite member and a metal casing having a pheripheral wall tightly surrounding said composite elements, said casing having an open end and being closed at the opposite end by a bottom wall provided with means for feeding a gas under pressure against a face of said composite member abutting against said bottom wall, said method comprising the steps of cutting a non-porous refractory brick, available on the market and normally used to form part of the refractory lining of a metallurgical container, longitudinally in direction of its height into a plurality of non-porous refractory elements; juxtaposing the elements without any seal between the same; holding said juxtaposed elements together by a peripheral wall of a metallic casing; and closing the metallic casing at one end thereof by a bottom wall equipped with means for introducing a gas under pressure.

20. A method as defined in claim 19, wherein the cross section of said peripheral wall of said metallic casing is greater than the cross section of said composite member, and including the step of pouring a layer of non-porous refractory concrete between said composite member and said peripheral wall of said casing.

21. A method as defined in claim 19, and including the step of inserting separating means between the refractory elements and holding said refractory juxtaposed elements and said separating means therebetween together by said peripheral wall of said casing.

22. A method as defined in claim 21, wherein said separating means consists of spaced calibrated spacing blocks.

23. A method as defined in claim 21, wherein said separating means consists of porous refractory plates.

24. A method as defined in claim 21, wherein said separating means consists of metal sheets.

25. A method as defined in claim 19, and including the step of forming at least on one lateral face of each of said elements a plurality of spaced grooves extending in the direction of the height of each element before these elements are juxtaposed upon each other.

26. A method as defined in claim 19, wherein said peripheral wall of said metal casing consists of two U-shaped half shells, and including the step of applying said two U-shaped half shells under pressure against the outermost of said juxtaposed refractory elements, and subsequently joining the half shells at facing edges thereof.

27. A method as defined in claim 19, wherein the initial non-porous brick which is cut into a plurality of non-porous refractory elements is of tar-impregnated refractory material, and including the step of subjecting the elements obtained by cutting the brick before assembly to a tempered heating to eliminate the most volatile elements.

*28. For use in a metallurgical container having an inner refractory lining and containing a bath of molten metal, a composite refractory member permeable to gas adapted to be incorporated in the refractory lining of the container below the surface of the bath so that one of the faces of the composite member is in contact with the molten metal, said composite refractory member including an assembly of non-porous refractory elements juxtaposed without seals between the same in order to provide a plurality of discontinuities extending throughout the height of the composite member between the face in contact with the molten metal and an opposite face; and means for feeding a gas under pressure against said opposite face.*

*29. A composite member as defined in claim 28, wherein said composite member has a generally hexahedral shape.*

*30. A composite member as defined in claim 28, wherein said non-porous refractory elements are plate-shaped and are juxtaposed at their main lateral faces.*

*31. A composite member as defined in claim 28, wherein said non-porous refractory elements are of elongated shape and are juxtaposed parallel to each other with said discontinuities extending transverse to each other.*

*32. A composite member as defined in claim 30, wherein said juxtaposed non-porous refractory elements are in contact with each other along their main lateral faces.*

*33. A composite member as defined in claim 28, and including separating means inserted between said juxtaposed non-porous refractory elements to keep the same a short distance from each other.*

*34. A composite member as defined in claim 33, wherein said separating means consists of calibrated spacing blocks.*

*35. A composite member as defined in claim 34, wherein said spacing blocks are wires extending spaced from each other and being oriented in the direction of the height of the composite member.*

*36. A composite refractory member as defined in claim 34, wherein said spacing blocks are inserts of refractory concrete, and wherein said non-porous refractory elements are respectively provided with opposite longitudinal notches in which said inserts are respectively lodged.*

*37. A composite refractory member as defined in claim 33, wherein said separating means consist of joint partitions inserted without play between the juxtaposed nonporous refractory elements.*

*38. A composite refractory member as defined in claim 37, wherein said partitions are porous refractory plates.*

*39. A composite refractory member as defined in claim 37, wherein said partitions are thin metal sheets.*

*40. A composite refractory member as defined in claim 30, wherein said plate-shaped non-porous refractory elements are provided at least at one of the faces thereof facing an adjacent plate-shaped element with a plurality of transversely spaced grooves extending between the face of said composite refractory member in contact with the metal and its opposite face.*

*41. A composite refractory member as defined in claim 28, wherein said non-porous elements are blocks shaped and arranged with respect to each other to form together a composite member of generally hexahedral shape, each of said blocks having at least two faces directed against faces of adjacent blocks and including metal spacer elements between said faces of said blocks.*

*42. A composite refractory member as defined in claim 29, and including a metallic casing having a peripheral wall tightly enclosing said composite refractory member and a bottom wall, said casing having an open end at the face of the composite member in contact with the molten material, said means for feeding gas under pressure against the opposite face of said composite member being provided at said bottom wall.*

*43. A composite refractory member as defined in claim 42, and including a gas distribution chamber between said bottom wall and said composite member, said gas distribution chamber communicating with said discontinuities.*

*44. A composite refractory member as defined in claim 42, wherein said peripheral wall consists of two U-shaped shells joined at facing edges thereof.*

*45. A composite refractory member as defined in claim 42, and including a peripheral layer of non-porous refractory concrete sandwiched between said composite member and said lateral wall of said casing.*

*46. A method of producing a composite refractory member including an assembly of non-porous refractory elements juxtaposed without any seals between the same in order to provide a plurality of discontinuities extending through the height of the composite member and a metal casing having a peripheral wall tightly surrounding said refractory elements, said casing having an open end and being closed at the opposite end by a bottom wall provided with means for feeding a gas under pressure against a face of said composite member abutting against said bottom wall, said method comprising the steps of cutting a non-porous refractory brick, available on the market and normally used to form part of the refractory lining of a metallurgical container, longitudinally in direction of its height into a plurality of non-porous refractory elements; juxtaposing the elements without any seal between the same; holding said juxtaposed elements together by a peripheral wall of a metallic casing; and closing the metallic casing at one end thereof by a bottom wall equipped with means for introducing a gas under pressure.*

*47. A method as defined in claim 46, wherein said cross section of said peripheral wall of said metallic casing is greater than the cross section of said composite member, and including the step of pouring a layer of non-porous refractory concrete between said composite member and said peripheral wall of said casing.*

*48. A method as defined in claim 46, and including the step of inserting separating means between the refractory elements and holding said refractory juxtaposed elements and said separating means therebetween together by said peripheral wall of said casing.*

*49. A method as defined in claim 48, wherein said separating means consists of spaced calibrated spacing blocks.*

*50. A method as defined in claim 48, wherein said separating means consists of porous refractory plates.*

*51. A method as defined in claim 48, wherein said separating means consists of metal sheets.*

*52. A method as defined in claim 46, and including the step of forming at least on one lateral face of each of said elements a plurality of spaced grooves extending in the*

*direction of the height of each element before these elements are juxtaposed upon each other.*

*53. A method as defined in claim 46, wherein said peripheral wall of said metal casing consists of two U-shaped half shells, and including the step of applying said two U-shaped half shells under pressure against the outermost of said juxtaposed refractory elements, and subsequently joining the half shells at facing edges thereof.*

*54. A method as defined in claim 46, wherein the initial non-porous brick which is cut into a plurality of non-porous refractory elements is of tar-impregnated refractory material, and including the step of subjecting the elements obtained by cutting the brick before assembly to a tempered heating to eliminate the most volatile elements.*

*55. For use in a metallurgical container having an inner refractory lining and containing a bath of molten metal, a refractory member permeable to gas adapted to be incorporated in the refractory lining of the container below the surface of the bath so that one of the faces of the refractory member will be in contact with the molten metal, said refractory member including an assembly of at least two non-porous refractory elements juxtaposed in order to provide at least one discontinuity extending throughout the height of the member between the face in contact with the molten metal and an opposite face; and means for feeding a gas under pressure against said opposite face.*

*56. A refractory member as defined in claim 55, wherein said refractory member has a generally hexahedral shape.*

*57. A refractory member as defined in claim 55 or 56, wherein said non-porous refractory elements are plate-shaped and are juxtaposed at their main lateral faces.*

*58.* A refractory member as defined in claim 57, wherein said juxtaposed non-*porous refractory elements are in contact with each other along their main lateral faces.*

*59. A refractory member as defined in claim 55 or 56, and including separating means inserted between said juxtaposed non-porous refractory elements to keep the same a short distance from each other.*

*60. A refractory member as defined in claim 59, wherein said separating means consists of calibrated spacing blocks.*

*61. A refractory member as defined in claim 60, wherein said spacing blocks are wires extending spaced from each other and oriented in the direction of the height of the refractory member.*

*62. A refractory member as defined in claim 60, wherein said spacing blocks are inserts of refractory concrete, and wherein said non-porous refractory elements are respectively provided with opposite longitudinal notches in which said inserts are respectively lodged.*

*63. A refractory member as defined in claim 59, wherein said separating means consist of joint partitions inserted without play between the juxtaposed non-porous refractory elements.*

*64. A refractory member as defined in claim 63, wherein said partitions are porous refractory plates.*

*65. A refractory member as defined in claim 63, wherein said partitions are thin metal sheets.*

*66. A refractory member as defined in claim 59, wherein said separating means are thin metallic sheets.*

*67. A refractory member as defined in claim 57, wherein said plate-shaped non-porous refractory elements are provided at least at one of the faces thereof facing an adjacent plate-shaped element with a plurality of transversely spaced grooves extending between the face of said refractory member in contact with the metal and its opposite face.*

*68. A refractory member as defined in claim 55, wherein said non-porous elements are blocks shaped and arranged with respect to each other to form together a refractory member of generally hexahedral shape, each of said blocks having at least one face directed against a face of an adjacent block and including metal spacer elements between said faces of said blocks.*

*69. A refractory member as defined in claim 55, 56 or 68, and including a metallic casing having a peripheral wall tightly enclosing said refractory elements and a bottom wall, said casing having an open end at the face of the refractory member intended to contact the molten material, said means for feeding gas under pressure against the opposite face of said refractory member being provided at said bottom wall.*

*70. A refractory member as defined in claim 69, and including a gas distribution chamber means between said bottom wall and said refractory elements, said gas distribution chamber means communicating with said discontinuity.*

*71. A refractory member as defined in claim 69, wherein said metallic casing consists of two U-shaped shells joined at facing edges thereof.*

*72. A refractory member as defined in claim 69, and including a peripheral layer of non-porous refractory concrete sandwiched between said refractory elements and said lateral wall of said casing.*

*73. A method of producing a refractory member including an assembly of at least two non-porous refractory elements juxtaposed in order to provide at least one discontinuity extending through the height of the refractory member and a metal casing having a peripheral wall tightly surrounding said refractory elements, said casing having an open end and being closed at the opposite end by a bottom wall provided with means for feeding a gas under pressure against a face of said refractory member abutting against said bottom wall, said method comprising the steps of forming at least two non-porous refractory elements; juxtaposing said two elements without any seal between the same; holding said juxtaposed elements together by a peripheral wall of a metallic casing; and closing the metallic casing at one end thereof by a bottom wall equipped with means for introducing a gas under pressure.*

*74. A method as defined in claim 73, wherein the cross section of said peripheral wall of said metallic casing is greater than the cross section of said refractory member, and including the step of pouring a layer of non-porous refractory concrete between said refractory elements and said peripheral wall of said casing.*

*75. A method as defined in claim 73 or 74, and including the step of inserting separating means between the refractory elements and holding said refractory elements and said separating means therebetween together by said peripheral wall of said casing.*

*76. A method as defined in claim 75, wherein said separating means consists of calibrated spacing blocks.*

*77. A method as defined in claim 75, wherein said separating means consists of porous refractory plates.*

*78. A method as defined in claim 75, wherein said separating means consists of metal sheets.*

*79. A method as defined in claim 75, and including the step of forming in at least one lateral face of at least one of said elements a plurality of spaced grooves extending in the direction of the height of said element before the elements are juxtaposed.*

*80. A method as defined in claim 75, wherein said peripheral wall of said metal casing consists of two U-shaped half shells, and including the step of applying said two U-shaped half shells under pressure against said juxta-*

*posed refractory elements, and subsequently joining the half shells at facing edges thereof.*

*81. A method as defined in claim 75, wherein said at least two non-porous refractory elements are of tar-impregnated refractory material, and including the step of subjecting the elements before assembly to a tempered heating to eliminate the most volatile elements.*

*82. A refractory device for delivery of gas to a molten metal in a vessel, including:*

*at least two adjacent refractory elements defining at least one gas passage therebetween;*

*said refractory elements being essentially non-porous; and*

*means for delivering gas under pressure to said gas passage in said refractory device.*

*83. A refractory device as defined in claim 82, wherein said refractory device has a generally hexahedral shape.*

*84. A refractory device as defined in claim 82 or 83, wherein said non-porous refractory elements are juxtaposed along main lateral faces thereof.*

*85. A refractory device as defined in claim 84, wherein said juxtaposed refractory elements are in contact with each other along their main lateral faces.*

*86. A refractory device as defined in claim 82 or 83, and including separating means inserted between said two refractory elements to keep the same a short distance from each other.*

*87. A refractory device as defined in claim 86, wherein said separating means consists of calibrated spacing blocks.*

*88. A refractory device as defined in claim 87, wherein said spacing blocks are wires extending spaced from each other and oriented in the direction of the height of the refractory member.*

*89. A refractory device as defined in claim 87, wherein said spacing blocks are inserts of refractory concrete, and wherein said non-porous refractory elements are respectively provided with opposite longitudinal notches in which said inserts are respectively lodged.*

*90. A refractory device as defined in claim 86, wherein said separating means consist of joint partitions inserted without play between the two adjacent non-porous refractory elements.*

*91. A refractory device as defined in claim 90, wherein said partitions are porous refractory plates.*

*92. A refractory device as defined in claim 90, wherein said partitions are thin metal sheets.*

*93. A refractory device as defined in claim 86, wherein said separating means are thin metallic sheets.*

*94. A method for producing a refractory device of at least two adjacent non-porous refractory elements having at least one gas passage therebetween, comprising the steps of:*

*placing at least two essentially non-porous refractory elements in adjacent relationship;*

*encasing said refractory elements in a metallic casing, said casing having one open end and one closed end; and*

*defining in said closed end means for introducing gas under pressure.*

*95. A method as defined in claim 94, wherein the cross section of said peripheral wall of said metallic casing is greater than the cross section of said refractory device, and including the step of pouring a layer of non-porous refractory concrete between said refractory elements and said peripheral wall of said casing.*

*96. A method as defined in claim 94 or 95, and including the step of inserting separating means between the refractory elements and holding said refractory elements and said separating means therebetween together by said peripheral wall of said casing.*

*97. A method as defined in claim 96, wherein said separating means consists of calibrated spacing blocks.*

*98. A method as defined in claim 96, wherein said separating means consists of porous refractory plates.*

99. A method as defined in claim 96, wherein said separating means consists of metal sheets.

*100. A method as defined in claim 96, and including the step of forming in at least one lateral face of at least one of said elements a plurality of spaced grooves extending in the direction of the height of said element before the elements are placed adjacent to each other.*

*101. A method as defined in claim 96, wherein said peripheral wall of said metal casing consists of two U-shaped half shells, and including the step of applying said two U-shaped half shells under pressure against said refractory elements, and subsequently joining the half shells at facing edges thereof.*

*102. A method as defined in claim 96, wherein said at least two non-porous refractory elements are of tar-impregnated refractory material, and including the step of subjecting the elements before assembly to a tempered heating to eliminate the most volatile elements.*

*103. A refractory gas-permeable structural unit for blowing a gas into a metal treatment vessel and through its casing, characterized by a passageway formed by faces of at least two elongated refractory elements, said elements being separated from one another by a thin metal layer so that gas passage takes place between said elements along said metallic layer, said elements each having first and second longitudinal faces and hot and cold end faces, said metallic layer being arranged on the first longitudinal face of at least one of said elements; a metal housing surrounding said elements to connect them with one another and sealingly abutting against said elements; and means for supplying gas and including a gas distribution chamber formed at said cold end faces of said elements and a conduit communicating with said distribution chamber.*

*104. A structural unit as defined in claim 103, and further comprising a mortar layer provided between said elements and said metal housing.*

*105. A structural unit as defined in claim 103, wherein said metal layer lies on the refractory material at said one first longitudinal face of each of said elements.*

*106. A structural unit as defined in claim 103, wherein said metal layer also has longitudinal faces, said longitudinal faces of said elements and of said metal layer being smooth.*

*107. A structural unit as defined in claim 103, wherein said metal layer is corrugated.*

*108. A structural unit as defined in claim 103, wherein said metal layer is composed of a steel sheet.*

*109. A structural unit as defined in claim 103, wherein the structural unit has a plurality of passageways arranged for gas passage and each provided with a metal layer.*

* * * * *